(12) United States Patent
Nakamura et al.

(10) Patent No.: US 7,316,988 B2
(45) Date of Patent: Jan. 8, 2008

(54) GAS TURBINE SINGLE PLANT MODIFYING METHOD, A CATALYST RE-USING METHOD AND A RE-PRODUCED CATALYST

(75) Inventors: Hitoshi Nakamura, Nagasaki (JP); Norihisa Kobayashi, Tokyo (JP); Kozo Iida, Hiroshima (JP); Osamu Naito, Nagasaki (JP); Yoshiaki Obayashi, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 104 days.

(21) Appl. No.: 10/405,618

(22) Filed: Apr. 3, 2003

(65) Prior Publication Data

US 2003/0195113 A1    Oct. 16, 2003

(30) Foreign Application Priority Data

Apr. 10, 2002 (JP) ............................. 2002-107720
Oct. 9, 2002 (JP) ............................. 2002-296071

(51) Int. Cl.
*B01J 23/00* (2006.01)
*B01J 23/24* (2006.01)
*B01J 21/00* (2006.01)

(52) U.S. Cl. ................... 502/312; 502/20; 502/309; 502/350; 502/353; 502/22

(58) Field of Classification Search .................. 502/20, 502/309, 312, 350, 353, 22; 60/39.182
See application file for complete search history.

(56) References Cited

U.S. PATENT DOCUMENTS

| | | | | |
|---|---|---|---|---|
| 3,260,505 A | * | 7/1966 | Ver Snyder | ................ 416/179 |
| 4,311,611 A | * | 1/1982 | Sasaki et al. | ................ 502/22 |
| 4,466,947 A | * | 8/1984 | Imanari et al. | ......... 423/239.1 |
| 4,656,147 A | * | 4/1987 | Iida et al. | ...................... 502/26 |
| 4,875,436 A | | 10/1989 | Smith et al. | |
| 5,047,378 A | * | 9/1991 | Kato et al. | .................... 502/74 |
| 5,582,809 A | * | 12/1996 | Rikimaru et al. | ......... 423/239.1 |
| 5,723,404 A | * | 3/1998 | Butje et al. | ................ 502/350 |
| 5,855,111 A | | 1/1999 | Oguchi et al. | |
| 5,904,040 A | * | 5/1999 | Hums et al. | ............. 60/39.465 |

(Continued)

FOREIGN PATENT DOCUMENTS

EP    0417667 A1    3/1991

(Continued)

*Primary Examiner*—Cam N. Nguyen
(74) *Attorney, Agent, or Firm*—Wenderoth, Lind & Ponack, L.L.P.

(57) ABSTRACT

A high temperature denitration catalyst of a gas turbine single plant contains $TiO_2$, at least one of $WO_3$ and $MoO_3$ and $V_2O_5$ of 0.5 wt % or less, preferably 0.2 wt % or less, or none of $V_2O_5$, and is optimized to be used in a temperature range up to a maximum 450 to 600° C. The used high temperature denitration catalyst is immersed into a V-containing water solution and dried and/or burned. An intermediate temperature denitration catalyst is produced containing a $V_2O_5$ component of 0.5 wt % or more, preferably 1.0 wt % or more, and is optimized for use in a temperature range of 250 to 450° C. This intermediate temperature denitration catalyst is re-used in a combined cycle plant after being modified or in other plants.

14 Claims, 2 Drawing Sheets

U.S. PATENT DOCUMENTS

| | | | |
|---|---|---|---|
| 5,916,382 A * | 6/1999 | Sato et al. ................ | 148/404 |
| 6,025,292 A * | 2/2000 | Obayashi et al. ........... | 502/27 |
| 6,559,085 B1 * | 5/2003 | Sasaki et al. ............... | 502/22 |
| 6,673,740 B2 * | 1/2004 | Choi et al. ................. | 502/309 |
| 6,800,585 B2 * | 10/2004 | Choi et al. ................. | 502/220 |

FOREIGN PATENT DOCUMENTS

| | | |
|---|---|---|
| EP | 0567964 A2 | 11/1993 |
| JP | 08-260912 * | 10/1996 |
| JP | 10-235209 | 9/1998 |

* cited by examiner

GAS TURBINE SINGLE PLANT MODIFYING METHOD, A CATALYST RE-USING METHOD AND A RE-PRODUCED CATALYST

BACKGROUND OF THE INVENTION

1. Field of the Invention

The present invention relates to a method for modifying a gas turbine single plant into a combined cycle plant comprising a combination of the gas turbine, a waste heat recovery boiler and a steam turbine and a method for re-using a used high temperature denitration catalyst of the gas turbine single plant as an intermediate temperature denitration catalyst of other modified, existing or new plants, and also relates to a re-produced catalyst.

2. Description of the Prior Art

Recently, in order to cope with an urgent demand for electric power, there are often constructed gas turbine single plants that are excellent in operability and constructible with less investment cost and over a shorter period. However, the gas turbine single plant is less excellent in long term plant efficiency, and hence it is effective that a gas turbine single plant is first constructed to be modified in the future by re-powering work into a combined cycle plant that is excellent in plant efficiency. (See Patent Document 1 below, for example.)

On the other hand, in denitration equipment that is installed for denitration of the exhaust gas in a power plant or the like, there is used a catalyst that contains $TiO_2$ (titanium oxide) as a main component and includes at least one of $WO_3$ (tungsten oxide) and $MoO_3$ (molybdenum oxide) and further includes $V_2O_5$ (vanadium oxide).

In the gas turbine single plant, as the temperature of the exhaust gas to be denitrified is as high as 450 to 600° C., a high temperature denitration catalyst is used. In the high temperature denitration catalyst, $V_2O_5$ that is vulnerable at the high temperature is used only in a minute amount or no $V_2O_5$ is included. (See Patent Document 2 below, for example.)

That is, the denitration catalyst containing the minute amount or none of $V_2O_5$ component is a catalyst that is optimized for high temperature. Hence, if the gas turbine single plant is once re-powered into a combined cycle plant as mentioned above, this high temperature denitration catalyst cannot be used for the combined cycle plant in which the temperature of the exhaust gas to be denitrified is an intermediate temperature of 200 to 450° C.

For the reason as explained above, when the gas turbine single plant is to be re-powered into the combined cycle plant, the high temperature denitration catalyst that has been used in the gas turbine single plant is wasted and an intermediate temperature denitration catalyst must be newly adopted for the combined cycle plant. This invites an increase in the investment cost of the plant.

Patent Document 1
Japanese laid-open patent application 1996-260912
(Paragraphs 0004, 0005 and 0009 to 0018)
Patent Document 2
Japanese laid-open patent application 1994-079139
(Paragraphs 0013 to 0018)

SUMMARY OF THE INVENTION

In view of the problem in the prior art, it is an object of the present invention, when a gas turbine single plant is to be modified into a combined cycle plant, to provide a method for economically realizing the combined cycle plant by which a high temperature denitration catalyst that has been used in the gas turbine single plant is re-produced as an intermediate temperature denitration catalyst to be re-used as a denitration catalyst of the combined cycle plant. It is also an object of the present invention to provide a method for re-using a used high temperature denitration catalyst as well as to provide a re-produced catalyst.

In order to achieve the above mentioned object, the present invention provides a method for modifying a gas turbine single plant into a combined cycle plant by which, in modifying the gas turbine single plant into a combined cycle plant, a used high temperature denitration catalyst is re-produced as an intermediate temperature denitration catalyst, and this re-produced intermediate temperature denitration catalyst is re-used as a denitration catalyst of the combined cycle plant after being modified.

According to this modifying method, the used high temperature denitration catalyst of the gas turbine single plant is re-produced as the intermediate temperature denitration catalyst to be used for the combined cycle plant. Thereby, the equipment cost required for the re-powering of the plant can be largely reduced.

Thus, according to the modifying method of the present invention, the used high temperature denitration catalyst is re-used, the waste cost thereof is saved and thereby a burden on the environment caused by the waste can be alleviated.

Also, the present invention provides a method for re-using a used high temperature denitration catalyst by which the used high temperature denitration catalyst of a gas turbine single plant is re-produced as an intermediate temperature denitration catalyst, and this re-produced intermediate temperature denitration catalyst is re-used as an intermediate temperature denitration catalyst of other modified, existing or new plants.

According to this re-using method of the present invention, in re-powering the gas turbine single plant, the used high temperature denitration catalyst can be effectively re-used as an intermediate temperature denitration catalyst and thereby a re-selling business of the catalyst as an intermediate temperature denitration catalyst of modified, existing or new plants other than the mentioned gas turbine single plant can be appropriately realized corresponding to a required amount of the catalyst, a geographical position of the plant or the like.

In a representative high temperature denitration catalyst used in the gas turbine single plant as the object of the present invention, $TiO_2$ is included as a main component and at least one of $WO_3$ and $MoO_3$ is also included. Also, the composition may include $V_2O_5$ of 0.5 wt(weight) % or less, preferably 0.2 wt % or less, or may include none of $V_2O_5$.

Especially if the used high temperature denitration catalyst is of the above mentioned composition, the quantity of the catalyst available for re-use is large and thus the modifying or re-using method of the present invention is extremely effective.

Also, with respect to the above mentioned modifying or re-using method, the present invention provides a modifying or re-using method in which the intermediate temperature denitration catalyst is re-produced by including $V_2O_5$ component of 0.5 wt % or more, preferably 1.0 wt % or more, in the used high temperature denitration catalyst, as well as providing a re-produced catalyst that is re-produced with the same composition included in the used high temperature denitration catalyst.

Further, with respect to the above mentioned modifying or re-using method, the present invention provides a modifying and re-using method in which, where the high temperature denitration catalyst to be re-used is a catalyst that is optimized so as to be used in the temperature range up to maximum 450 to 600° C., the intermediate temperature denitration catalyst is re-produced by including a V (vanadium) component in the used high temperature denitration catalyst and is optimized so as to be used in the temperature range of 200 to 450° C., as well as providing a re-produced catalyst that is optimized for the same temperature range.

Also, with respect to the above mentioned modifying or re-using method, the present invention provides a modifying or re-using method in which the inclusion treatment of the V component is carried out by immersion into a V-containing water solution and drying and/or burning as well as providing a re-produced catalyst that is re-produced by the same treatment.

According to the present invention, which has been made based on the expertise obtained by extensive studies on the temperature characteristics of the $TiO_2$ group denitration catalyst and on the re-producing technology of the denitration catalyst, when a gas turbine single plant is to be modified to be re-powered into a combined cycle plant, a modifying or re-using method and a re-produced catalyst by which the equipment cost can be extremely reduced, as well as the influence given on the environment is largely alleviated can be provided.

DESCRIPTION OF THE PREFERRED EMBODIMENTS

The present invention will be described below more concretely based on embodiments.

Figure 4:
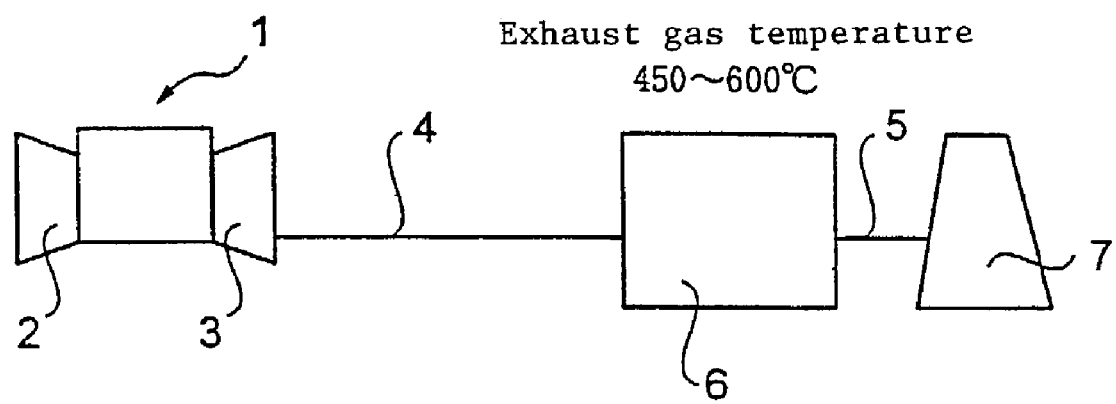
FIG. 4 is an explanatory view showing a construction of a gas turbine single plant in the prior art before it is modified into a combined cycle plant by applying the present invention.

FIG. 4 shows a gas turbine single plant in the prior art before it is modified into a combined cycle plant by applying the present invention.

In FIG. 4, numeral 1 designates gas turbine equipment, numeral 2 designates a compressor and numeral 3 designates a gas turbine. The construction is made such that exhaust gas of the gas turbine 3 flows through a duct 4 to be led into denitration equipment 6 for denitration treatment therein and then further flows through a duct 5 to be emitted into the air from a stack 7.

The temperature of the exhaust gas coming from the gas turbine 3 to be led into the denitration equipment 6 is as high as 450 to 600° C. Thus, in the denitration equipment 6 that effects the denitration treatment, a high temperature denitration catalyst is used so as to withstand such a high temperature for effecting the denitration reaction.

While the denitration catalyst contains $TiO_2$ as a main component and an active component, such as $WO_3$ or $MoO_3$, as the gas to be treated is of the high temperature as mentioned above, inclusion of a V component in the catalyst is very small or even zero such that $V_2O_5$, which is thermally vulnerable, is 0.5 wt % or less, preferably 0.2 wt % or less, or no $V_2O_5$ is included.

In the denitration equipment 6 using the denitration catalyst as mentioned above, the exhaust gas to be treated for denitration is first injected with $NH_3$ (ammonia) so as to be made to contact with the catalyst, and by the reactions of $4NO+4NH_3+O_2 \rightarrow 4N_2+6H_2O$, $NO+NO_2+2NH_3 \rightarrow 2N_2+3H_2O$, NO and $NO_2$ are decomposed into an innoxious nitrogen and water.

Figure 1:
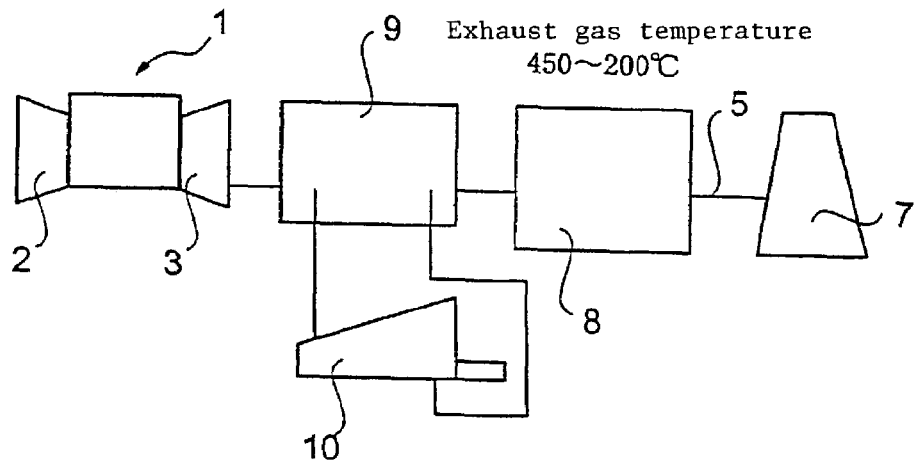
FIG. 1 is an explanatory view of a combined cycle plant made by modification of a gas turbine single plant of FIG. 4.

FIG. 1 shows a combined cycle plant modified by applying the present invention. In FIG. 1, numeral 9 designates an exhaust gas boiler that uses the exhaust gas of the gas turbine equipment 1 as a heat source. Numeral 10 designates a steam turbine that is operated by being supplied with steam generated at the exhaust gas boiler 9. As the result of heat recovery at the exhaust gas boiler 9, the temperature of the exhaust gas coming out of the exhaust gas boiler 9 is reduced to an intermediate temperature of 450 to 200° C.

This intermediate temperature exhaust gas is applied with the denitration treatment at the denitration equipment 8 and is then emitted into the air from the stack 7. In the denitration equipment 8 that treats this intermediate temperature exhaust gas of 450 to 200° C., the intermediate temperature denitration catalyst obtained by the present invention is used.

That is, the intermediate temperature denitration catalyst to be used in the denitration equipment 8 is re-produced from the high temperature denitration catalyst that has been used in the denitration equipment 6 of the gas turbine single plant shown in FIG. 4.

As mentioned above, the high temperature denitration catalyst used in the denitration equipment 6 of FIG. 4 contains $TiO_2$ as a main component and an active component of $WO_3$ or $MoO_3$ or the like, but inclusion of the V component that is thermally vulnerable is very small or even zero.

In order to produce the intermediate temperature denitration catalyst for the denitration equipment 8 from the used high temperature denitration catalyst of the denitration equipment 6, the used high temperature denitration catalyst is treated so as to contain $V_2O_5$ of 0.5 wt % or more, preferably 1.0 wt % or more.

For treating the $TiO_2 \cdot WO_3$ group high temperature denitration catalyst so as to contain $V_2O_5$, the catalyst is first immersed in an oxalic acid solution of $V_2O_5$ and is then dried and/or burned. If drying only is applied, the catalyst is changed to a burned state by the exhaust gas in actual operation.

One example of the procedures to treat the $TiO_2 \cdot WO_3$ group high temperature denitration catalyst so as to contain $V_2O_5$ is shown next:

(1) Measurement of Water Content of the Catalyst

The catalyst is immersed into water, the weight of the catalyst before and after immersion being measured, and the water content is decided by the following equation:

Water content $a$ (liter/kg)=(W2−W1)/W1(liter/kg)

Here, W1 is weight of the catalyst before immersion (kg) and W2 is weight of the catalyst after immersion (kg).

(2) Decision of $V_2O_5$ Concentration of the Immersion Liquid $V_2O_5$ concentration of the immersion liquid is decided by the following equation:

$V_2O_5$ concentration $X$(kg/liter)=$B \times 0.01/a$

Here, B is the desired $V_2O_5$ concentration in the catalyst and $a$ is the water content (liter/kg).

(3) Adjustment of the Immersion Liquid

Oxalic acid ($H_2C_2O_4$) of 2.5 Xkg is dissolved in warm water of about 0.9 liter. $V_2O_5$ powder Xkg is gradually added into this solution to be dissolved therein and then water is added so that a solution for immersion of 1 liter is made.

The used high temperature denitration catalyst is immersed into this immersion solution for about 1 minute. Then, this catalyst is dried and burned for 3 hours at 550° C.

In the above, while the present invention has been concretely described based on one embodiment, it is needless to mention that the invention is not limited to this embodiment but may be added to with various changes and modifications within the scope of the present invention as defined by the appended claims.

For example, the high temperature denitration catalyst to be re-used is not necessarily a $TiO_2.WO_3$ group catalyst.

Also, while the composition ratio of the high temperature denitration catalyst has been taken from a basic framework that $TiO_2$ is 60 to 80 wt %, $WO_3$ ($MoO_3$) is 5 to 25 wt % and $V_2O_5$ is 0 to 10 wt %, wherein $MoO_3$ is the alternative for $WO_3$, the composition ratio may be optimized according to the fuel for combustion, the temperature of the gas to be treated, etc.

Moreover, the procedure of treatment to give V component to the catalyst is not limited to the use of the oxalic acid solution but, for example, citric acid water solution, methylamine water solution of ammonium metavanadic acid, sulfamic acid water solution, etc. may be used as a wash medium.

In the above described embodiment as shown in FIG. 1, while the example of the construction of the combined cycle plant modified so as to have the denitration equipment 8 downstream of the exhaust gas boiler 9 has been described, if, in the gas turbine single plant, such a construction arrangement is considered beforehand that a space is left upstream of the denitration equipment 8 so that the exhaust gas boiler 8 may be added upstream of the denitration equipment 8 in the future when the gas turbine single plant is to be modified into a combined cycle plant, then the modification to the combined cycle plant can be done most easily and with less modification cost. In this case, as no exhaust gas boiler is to be provided downstream of the denitration equipment and no waste heat recovery is to be carried out in the low temperature range, there is left room for further enhancing the efficiency in the plant operation.

Figure 2:
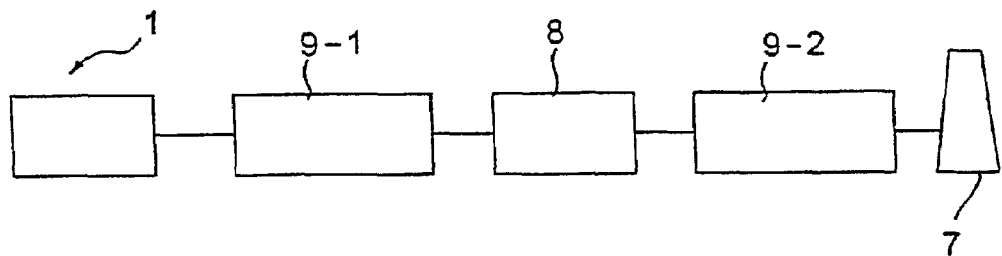
FIG. 2 is an explanatory view showing one example of a modified construction of the combined cycle plant of FIG. 1.

Also, the construction shown in FIG. 2 in which the denitration equipment 8 is interposed between an exhaust gas boiler 9-1 and an exhaust gas boiler 9-2 is made such that, in the gas turbine single plant, spaces are left beforehand upstream and downstream of the denitration equipment 8 and the two exhaust gas boilers 9-1, 9-2 are added on both sides of the denitration equipment 8 later in the modification to the combined cycle plant. In this case, while the cost for modification to the combined cycle plant becomes higher than the construction shown in FIG. 1, a larger waste heat recovery can be realized and a further enhanced efficiency can be expected in the plant operation.

Figure 3:
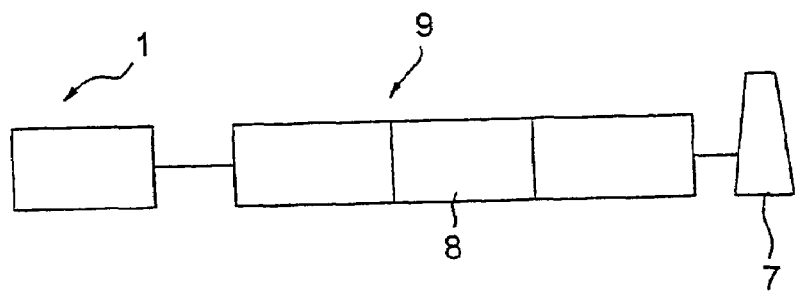
FIG. 3 is an explanatory view showing another example of a modified construction of the combined cycle plant of FIG. 1.

Further, the construction shown in FIG. 3 in which the denitration equipment 8 is assembled into the exhaust gas boiler 9 is made such that the denitration equipment 8 is structured beforehand so as to be assembled into the exhaust gas boiler and the denitration equipment 8 is so assembled later in the modification to the combined cycle plant. In this case, while the equipment structure and the modification work become somewhat complicated, the high efficiency in the plant operation is expected similarly to the construction shown in FIG. 2, the installation space is reduced and a compact sized plant can be realized.

It is a matter of course that the present invention is applicable to the modification to the combined cycle plant having various construction arrangements other than those illustrated and described above.

What is claimed is:

1. A method for modifying a gas turbine single plant into a combined cycle plant, comprising:
   re-producing a used high-temperature denitration catalyst of the gas turbine single plant which has been used in a temperature range of 450 to 600° C. into an intermediate temperature denitration catalyst, wherein said re-producing comprises including a V component in the used high temperature denitration catalyst;
   forming a combined cycle plant from the gas turbine single plant; and
   using the intermediate temperature denitration catalyst in the combined cycle in a temperature range of 200 to 450° C. plant after said forming.

2. The method of claim 1, wherein the used high temperature denitration catalyst contains $TiO_2$ as a main component and at least one of $WO_3$ and $MoO_3$, and further includes 0.5 wt. % or less of $V_2O_5$.

3. The method of claim 2, wherein the used high temperature denitration catalyst includes 0.2 wt. % or less of $V_2O_5$.

4. The method of claim 3, wherein the used high temperature denitration catalyst includes no $V_2O_5$.

5. The method of claim 1, wherein the intermediate temperature denitration catalyst comprises 0.5 wt % or more of $V_2O_5$ component.

6. The method of claim 5, wherein the intermediate temperature denitration catalyst comprises 1.0 wt % or more of $V_2O_5$ component.

7. The method of claim 1, wherein said including a V component is carried out by immersion into a V-containing water solution and drying and/or burning.

8. A method for re-using used high temperature denitration catalyst, comprising:
   re-producing the used high-temperature denitration catalyst of a gas turbine single plant which has been used in a temperature range of 450 to 600° C. into an intermediate temperature denitration catalyst, wherein said re-producing comprises including a V component in the used high temperature denitration catalyst; and
   using the intermediate temperature denitration catalyst in a modified, existing or new plant in a temperature range of 200 to 450° C.

9. The method of claim 8, wherein the used high temperature denitration catalyst contains $TiO_2$ as a main component and at least one of $WO_3$ and $MoO_3$, and further includes 0.5 wt. % or less of $V_2O_5$.

10. The method of claim 9, wherein the used high temperature denitration catalyst includes 0.2 wt. % or less of $V_2O_5$.

11. The method of claim 10, wherein the used high temperature denitration catalyst includes no $V_2O_5$.

12. The method of claim 8, wherein the intermediate temperature denitration catalyst comprises 0.5 wt % or more of a $V_2O_5$ component.

13. The method of claim 12, wherein the intermediate temperature denitration catalyst comprises 1.0 wt % or more of $V_2O_5$ component.

14. The method of claim 8, wherein said including a V component is carried out by immersion into a V-containing water solution and drying and/or burning.

* * * * *